US012175926B1

(12) United States Patent
Wu

(10) Patent No.: US 12,175,926 B1
(45) Date of Patent: Dec. 24, 2024

(54) COMPENSATING CIRCUIT FOR OVERDRIVING DATA SIGNAL OF DISPLAY DEVICE

(71) Applicant: HIMAX TECHNOLOGIES LIMITED, Tainan (TW)

(72) Inventor: Tung-Ying Wu, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 0 days.

(21) Appl. No.: 18/408,609

(22) Filed: Jan. 10, 2024

(51) Int. Cl.
*G09G 3/02* (2006.01)
*G09G 3/32* (2016.01)
*G09G 3/3208* (2016.01)

(52) U.S. Cl.
CPC ............ *G09G 3/32* (2013.01); *G09G 3/3208* (2013.01); *G09G 2300/0819* (2013.01); *G09G 2320/0233* (2013.01); *G09G 2320/0285* (2013.01)

(58) Field of Classification Search
CPC ... G09G 2320/0252; G09G 2320/0285; G09G 2340/16; G09G 2360/18; G09G 3/2092; G09G 3/3611
See application file for complete search history.

(56) References Cited

U.S. PATENT DOCUMENTS

2018/0090049 A1* 3/2018 Kim .................... G09G 3/3666
2022/0093052 A1* 3/2022 Wang .................. G09G 3/3648

* cited by examiner

*Primary Examiner* — Insa Sadio
(74) *Attorney, Agent, or Firm* — JCIPRNET

(57) ABSTRACT

The disclosure provides a compensating circuit for overdriving a data signal of display device. The compensating circuit includes a memory circuit, an offsetting circuit and an overdriving value generator. The memory circuit stores a first offset gray value of a first frame period. The offsetting circuit receives the first offset gray value, a duty value of an emission driving signal and a current gray value of the data signal. The offsetting circuit generates a second offset gray value of a second frame period according to the duty value, the current gray value and the first offset gray value, and stores the second offset gray value into the memory circuit. The overdriving value generator generates an overdriving value for overdriving the data signal to generate a compensated data signal according to the second offset gray value and the current gray value.

14 Claims, 8 Drawing Sheets

LUT3

Y3 Z3

| DT | |
|---|---|
| 0% | 0.94 |
| 12.5% | 0.95 |
| 25.0% | 0.96 |
| 37.5% | 0.98 |
| 50.0% | 0.99 |
| 62.5% | 1 |
| 75.0% | 1 |
| 87.5% | 1 |
| 100% | 1 |

FIG. 6

| | F1 | F2 | F3 | F4 |
|---|---|---|---|---|
| offset gray value | 0 | 49 | 60 | 62 |
| GR | 0→64 | 64 | 64 | 64 |
| VOD | 142 | 78 | 68 | 66 |
| VP | -16 | -4 | -2 | -1 |
| VG | 0.95 | 0.95 | 0.95 | 0.95 |
| modified offset gray value | 49 | 60 | 62 | 63 |

FIG. 7

COMPENSATING CIRCUIT FOR OVERDRIVING DATA SIGNAL OF DISPLAY DEVICE

BACKGROUND

Technical Field

The disclosure generally relates to a compensating circuit, and more particularly to a compensating circuit for overdriving data signal of display device.

Description of Related Art

Currently, a pixel of a display device (for example, a LED display device or an OLED display device) is driven by a data signal and an emission driving signal. Based on a low duty value of an emission driving signal and a low gray value of a data signal, it takes several frame periods for the brightness of the sub-pixel to reach the expected brightness.

Based on the low duty value of the emission driving signal and the low gray value of the data signal, numbers of the frame periods of brightness corresponding different color are different. For example, please refer to FIG. 1, FIG. 1 illustrates a schematic diagram of brightness with frames corresponding to a low duty value of an emission driving signal. FIG. 1 illustrates brightness curves CV1, CV2 and CV3. The brightness curve CV1 is a brightness curve of a red sub-pixel. The brightness curve CV2 is a brightness curve of a blue sub-pixel. The brightness curve CV3 is a brightness curve of a green sub-pixel. The duty value of the emission driving signal is lower than or equal to 50%. The low gray value of the data signal lower than or equal to “64”.

It should be noted, the brightness of the red sub-pixel needs two frame periods to reach the expected brightness BE. The brightness of the blue sub-pixel needs three frame periods to reach the expected brightness BE. The brightness of the green sub-pixel needs five frame periods to reach the expected brightness BE. When the image moves, the moving edge is blur because the above numbers of frame periods to reach the expected brightness BE are different. Thus, in order to improve a display quality of the display device, a number of the frame periods to reach the expected brightness BE should be decreased.

SUMMARY

The disclosure provides a compensating circuit for overdriving a data signal of display device. The compensating circuit can compensate the data signal to decreased a number of frame periods required for a brightness of a sub-pixel to reach the expected brightness.

The compensating circuit of the disclosure includes a memory circuit, an offsetting circuit and an overdriving value generator. The memory circuit stores a first offset gray value of a first frame period. The offsetting circuit is coupled to the memory circuit. The offsetting circuit receives the first offset gray value, a duty value of an emission driving signal and a current gray value of the data signal. The offsetting circuit generates a second offset gray value of a second frame period after the first frame period according to the duty value, the current gray value and the first offset gray value, and stores the second offset gray value into the memory circuit. The overdriving value generator is coupled to the memory circuit. The overdriving value generator generates an overdriving value for overdriving the data signal to generate a compensated data signal according to the second offset gray value and the current gray value.

Based on the above, the compensating circuit compensates the current gray value of the data signal according to offset gray values of different frame periods, the duty value of an emission driving signal and the current gray value. Therefore, the data signal could be overdriven with frame period progressively based on the offset gray values of different frame periods. The compensating circuit can compensate the data signal to decreased a number of frame periods required for a brightness of a sub-pixel to reach the expected brightness.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

FIG. 6 illustrates a schematic diagram of a gain look-up table according to an embodiment of the disclosure.

FIG. 7 illustrates an operating diagram according to an embodiment of the disclosure.

DESCRIPTION OF THE EMBODIMENTS

A disclosure may be understood by reference to the following detailed description, taken in conjunction with the drawings as described below. It is noted that, for purposes of illustrative clarity and being easily understood by the readers, various drawings of this disclosure show a portion of an electronic device, and certain elements in various drawings may not be drawn to scale. In addition, the number and dimension of each device shown in drawings are only illustrative and are not intended to limit the scope of a disclosure.

Certain terms are used throughout the description and following claims to refer to particular components. As one skilled in the art will understand, electronic equipment manufacturers may refer to a component by different names. This document does not intend to distinguish between components that differ in name but not function. In the following description and in the claims, the terms “include”, “comprise” and “have” are used in an open-ended fashion, and thus should be interpreted to mean “include, but not limited to . . . ”. Thus, when the terms “include”, “comprise”

and/or "have" are used in the description of a disclosure, the corresponding features, areas, steps, operations and/or components would be pointed to existence, but not limited to the existence of one or a plurality of the corresponding features, areas, steps, operations and/or components.

It will be understood that when an element is referred to as being "coupled to", "connected to", or "conducted to" another element, it may be directly connected to the other element and established directly electrical connection, or intervening elements may be presented therebetween for relaying electrical connection (indirectly electrical connection). In contrast, when an element is referred to as being "directly coupled to", "directly conducted to", or "directly connected to" another element, there are no intervening elements presented.

Figure 2:
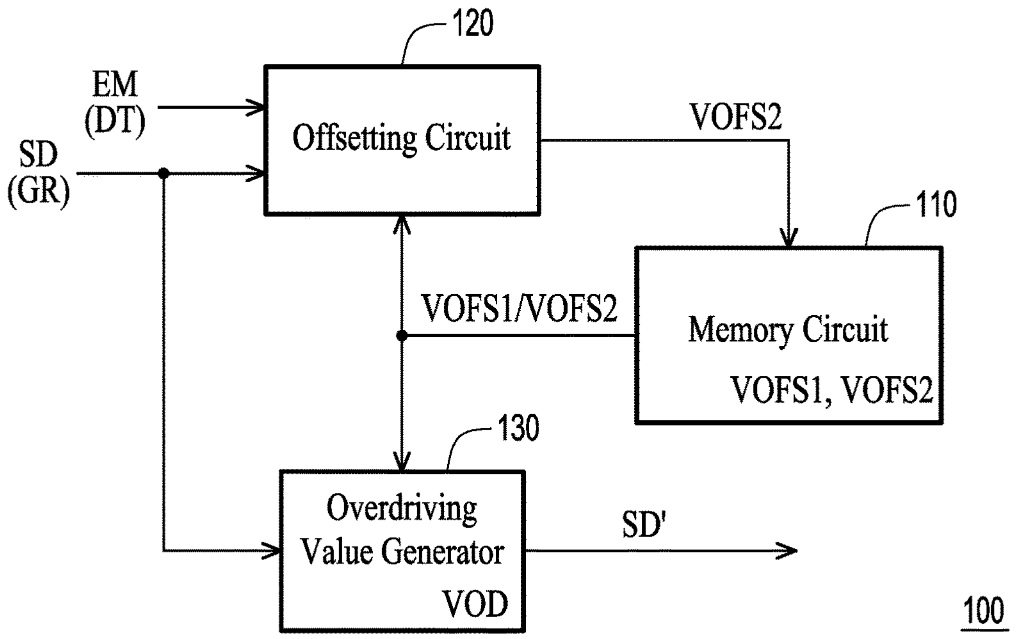
FIG. 2 illustrates a schematic diagram of a compensating circuit according to a first embodiment of the disclosure.

Please refer to FIG. 2, FIG. 2 illustrates a schematic diagram of a compensating circuit according to a first embodiment of the disclosure. In the embodiment, the compensating circuit 100 is used for a display device. In the embodiment, the display device may be a LED display device or an OLED display device, but the disclosure is not limited thereto. At least one of sub-pixels of the display device is driven by a data signal SD and an emission driving signal EM.

In the embodiment, the compensating circuit 100 includes a memory circuit 110, an offsetting circuit 120 and an overdriving value generator 130. The memory circuit 110 stores a first offset gray value VOFS1 of a first frame period.

The offsetting circuit 120 is coupled to the memory circuit 110. The offsetting circuit 120 receives the first offset gray value VOFS1, a duty value DT of the emission driving signal EM and a current gray value GR of the data signal SD. The offsetting circuit 120 generates a second offset gray value VOFS2 of a second frame period after the first frame period according to the duty value DT, the current gray value GR and the first offset gray value VOFS1, and stores the second offset gray value VOFS2 into the memory circuit.

The overdriving value generator 130 is coupled to the memory circuit 110. The overdriving value generator 130 generates an overdriving value VOD according to the second offset gray value VOFS2 and the current gray value GR. The overdriving value VOD is used to overdrive the data signal SD to generate a compensated data signal SD'.

It should be noted, the compensating circuit 100 compensates the current gray value GR of the data signal SD according to offset gray values (that is, the first offset gray value VOFS1 and the second offset gray value VOFS2) of different frame periods, a duty value DT of an emission driving signal EM and the current gray value GR. Therefore, the data signal SD could be overdriven with frame period progressively based on the offset gray values and the duty values of different frame periods. In this way, the number of frame periods required for a brightness of the sub-pixel to reach the expected brightness can be reduced.

In the embodiment, the overdriving value generator 130 generates the compensated data signal SD' according to the overdriving value VOD. In the embodiment, the overdriving value VOD is a gray value of the compensated data signal SD' of the second frame period.

In the embodiment, the memory circuit 110 may be a memory element well known to those skilled in the art. In the first frame period, the memory circuit 110 stores the first offset gray value VOFS1. The offsetting circuit 120 reads the first offset gray value VOFS1 stored in the memory circuit 110 and generates the second offset gray value VOFS2 in the first frame period. The first offset gray value VOFS1 stored in the memory circuit 110 is replaced with the second offset gray value VOFS2. In the second frame period, the overdriving value generator 130 generates the overdriving value VOD according to the second offset gray value VOFS2 and the current gray value GR.

Then, in the second frame period, the offsetting circuit 120 reads the second offset gray value VOFS2 stored in the memory circuit 110 and generates a third offset gray value (not shown) according to the duty value DT, the current gray value GR and the second offset gray value VOFS2. The second offset gray value VOFS2 stored in the memory circuit 110 is replaced with the third offset gray value. In a third frame period after the second frame period, the overdriving value generator 130 generates the overdriving value VOD according to the third offset gray value and the current gray value GR.

Figure 3:
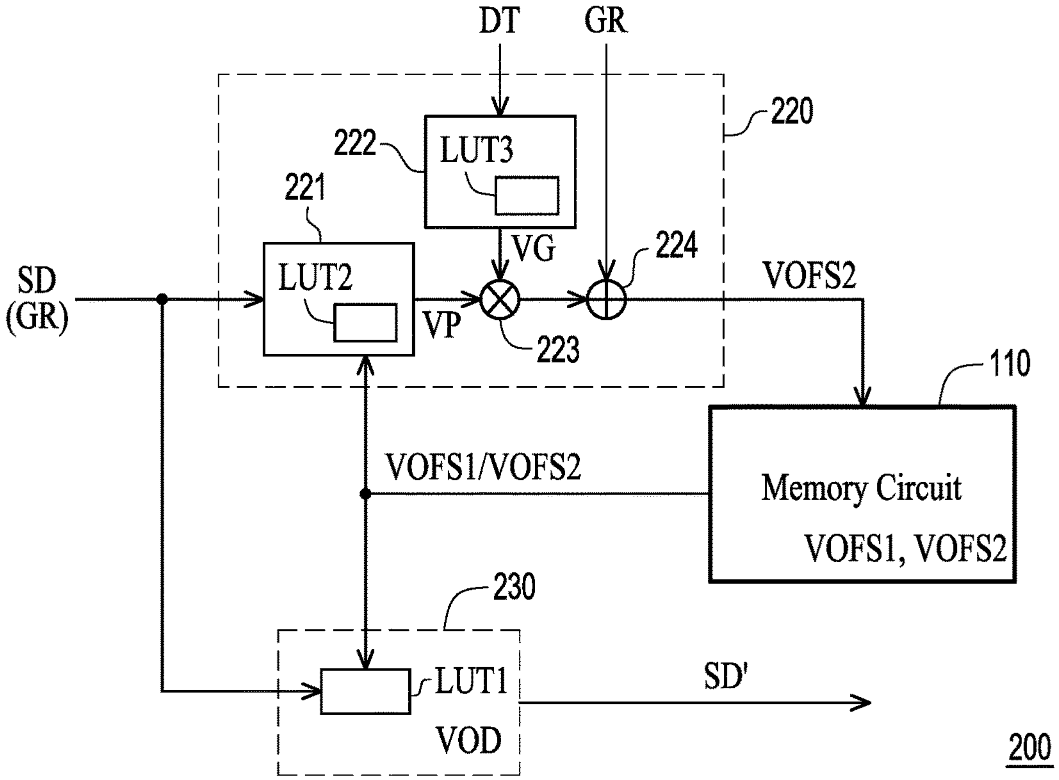
FIG. 3 illustrates a schematic diagram of a compensating circuit according to a second embodiment of the disclosure.
Figure 4:
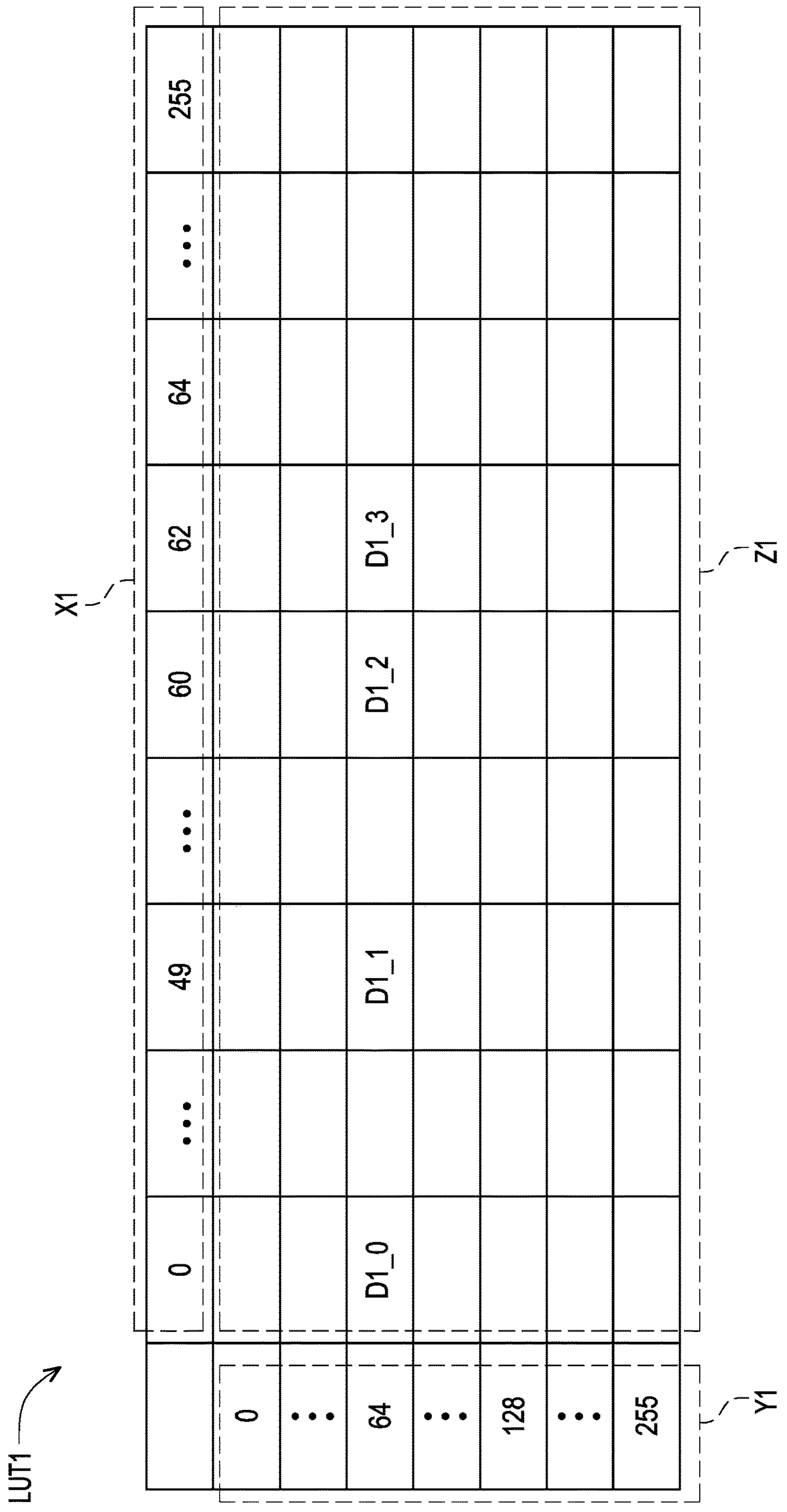
FIG. 4 illustrates a schematic diagram of an overdriving look-up table according to an embodiment of the disclosure.

Please refer to FIG. 3, FIG. 3 illustrates a schematic diagram of a compensating circuit according to a second embodiment of the disclosure. In the embodiment, the compensating circuit 200 includes a memory circuit 110, an offsetting circuit 220 and an overdriving value generator 230. The memory circuit 110 has been clearly explained in the embodiments of FIG. 2, so it will not be repeated here.

In the embodiment, the overdriving value generator 230 generates the overdriving value VOD according to a variation between the second offset gray value VOFS2 and the current gray value GR in the second frame period.

Detailly, the overdriving value generator 230 generates the overdriving value VOD according to the variation from the second offset gray value VOFS2 to the current gray value GR in the second frame period.

In the embodiment, the offsetting circuit 220 includes a frame progressive offsetting circuit 221 and a gain value generator 222. The frame progressive offsetting circuit generates a progressive value VP according to the current gray value GR and the first offset gray value VOFS1. The gain value generator 222 generates a gain value VG corresponding the duty value DT of the emission driving signal EM. The offsetting circuit 220 generates the second offset gray value VOFS2 according to the gain value VG, the progressive value VP and the current gray value GR.

In the embodiment, the offsetting circuit 220 further includes a multiplier 223 and an adder 224. The multiplier 223 is coupled to the frame progressive offsetting circuit 221 and the gain value generator 222. The multiplier 223 multiplies the progressive value VP and the gain value VG to generate a product value V1. The adder 224 is coupled to the multiplier 223 and the memory circuit 110. The adder 224 adds the current gray value GR and the product value V1 to generate the second offset gray value VOFS2.

Figure 5:
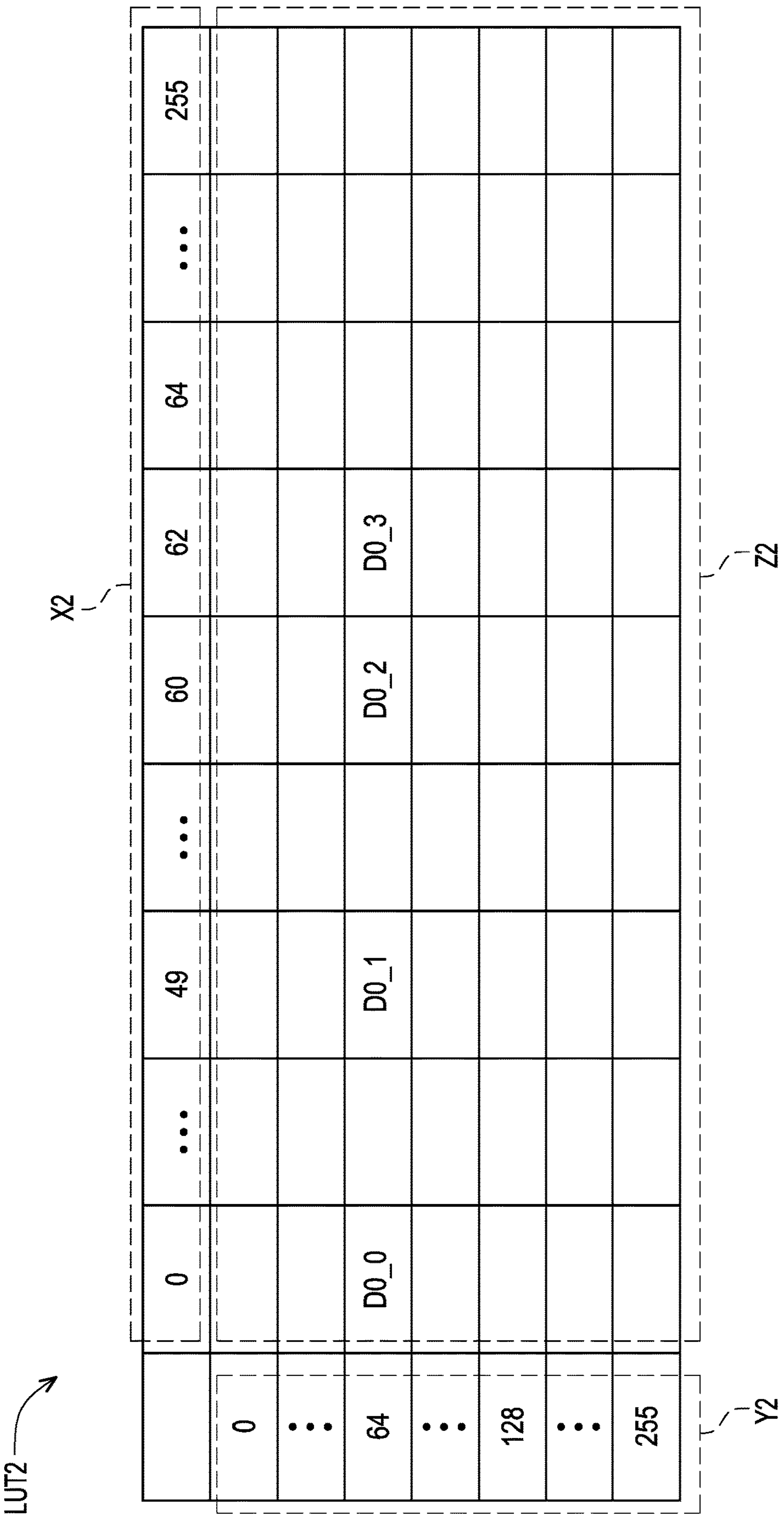
FIG. 5 illustrates a schematic diagram of an offsetting look-up table according to an embodiment of the disclosure.

Please refer to FIG. 3, FIG. 4, FIG. 5, FIG. 6 and FIG. 7, FIG. 4 illustrates a schematic diagram of an overdriving look-up table according to an embodiment of the disclosure. FIG. 5 illustrates a schematic diagram of an offsetting look-up table according to an embodiment of the disclosure. FIG. 6 illustrates a schematic diagram of a gain look-up table according to an embodiment of the disclosure. FIG. 7 illustrates an operating diagram according to an embodiment of the disclosure. In the embodiment, the overdriving value generator 230 includes an overdriving look-up table LUT1 corresponding to a first color (for example, red). The overdriving look-up table LUT1 stores first values corresponding different second offset gray values and different current gray values of the data signal SD. The overdriving value generator 230 selects one of the first values to be the overdriving value VOD according to an offset gray value and the current gray value GR received by the overdriving value generator 230.

In the embodiment, the overdriving look-up table LUT1 includes regions X1, Y1 and Z1. The region X1 records different offset gray values (including the first offset gray value VOFS1 and the second offset gray value VOFS2). The offset gray values in the region X1 are acted as "previously gray values" of the data signal SD. The offset gray values are "0" to "255" . . . . The region Y1 records different "current gray values" of the data signal SD. The current gray values are "0" to "255"". The region Z1 stores the first values.

Besides, the overdriving value generator 230 may further include an overdriving look-up table corresponding to a second color (for example, green) and an overdriving look-up table corresponding to a third color (for example, blue).

The frame progressive offsetting circuit 221 includes an offsetting look-up table LUT2 corresponding to the first color (for example, red). The offsetting look-up table LUT2 stores second values corresponding different offset gray values and different current gray values of the data signal SD. The frame progressive offsetting circuit 221 selects one of the second values to be the progressive value VP according to an offset gray value and the current gray value GR received by the frame progressive offsetting circuit 221.

In the embodiment, the offsetting look-up table LUT2 includes regions X2, Y2 and Z2. The region X2 records different previously gray values (that is, the offset gray values). The current gray values are "0" to "255". The region Y2 records different current gray values of the data signal SD. The region Z2 stores the second values.

Besides, the frame progressive offsetting circuit 221 may further include an offsetting look-up table corresponding to a second color (for example, green) and an offsetting look-up table corresponding to a third color (for example, blue).

The gain value generator 222 includes a gain look-up table LUT3 corresponding to the first color (for example, red). The gain look-up table LUT3 stores third values corresponding different duty values. The gain value generator 222 selects one of the third values to be the gain value VG according to the duty value DT received by the gain value generator 222.

In the embodiment, the gain look-up table LUT3 includes regions Y3 and Z3. The region Y3 records different duty values of the emission driving signal EM. The current gray values are "0%" to "100%". The region Z3 stores the third values. In the embodiment, the third values are positively correlated with the duty values low than 50% received by the gain value generator.

Besides, the gain value generator 222 may further include a gain look-up table corresponding to a second color (for example, green) and gain look-up table corresponding to a third color (for example, blue).

For example, the duty value DT of the emission driving signal EM is "12.5%". The gain value VG is "0.95" based on the gain look-up table LUT3, but the disclosure is not limited thereto. In an initial frame period, the previously gray value of the data signal SD and the offset gray value is "0". In the frame period F1 (that is, the first frame period), the current gray value GR of the data signal SD is "64". In other words, in the frame period F1, the gray value is changed from "0" to "64". Therefore, based on the overdriving look-up table LUT1, the overdriving value generator 230 selects the first value D1_0 to be the overdriving value VOD. The first value D1_0 is "142", but the disclosure is not limited thereto. Therefore, the gray value of the compensated data signal SD' is "142" in frame period F1.

In the frame period F1, based on the offsetting look-up table LUT2, the frame progressive offsetting circuit 221 selects the second value D0_0 to be the progressive value VP. The second value D0_0 is "−16", but the disclosure is not limited thereto. Therefore, the progressive value VP is "−16". The offsetting circuit 220 generates the second offset gray value VOFS2 by the multiplier 223 and the adder 224. In the frame period F1, the second offset gray value VOFS2 is about "49" (that is, VOFS2=(−16)×0.95+64). The offsetting circuit 220 stores the second offset gray value VOFS2 (that is, modified offset gray value in FIG. 7) into the memory circuit 110.

In the frame period F2 (that is, the second frame period), the current gray value GR of the data signal SD is still "64". The second offset gray value VOFS2 is about "49". Therefore, based on the overdriving look-up table LUT1, the overdriving value generator 230 selects the first value D1_1 to be the overdriving value VOD. The first value D1_1 is "78", but the disclosure is not limited thereto. Therefore, the gray value of the compensated data signal SD' is "78" in frame period F2. Based on the offsetting look-up table LUT2, the frame progressive offsetting circuit 221 selects the second value D0_1 to be the progressive value VP according to the second offset gray value VOFS2 and the current gray value GR. The second value D0_1 is "−4", but the disclosure is not limited thereto. Therefore, the progressive value VP is "−4" in the frame period F2. The gain value VG is still "0.95". The offsetting circuit 220 generates the third offset gray value. In the frame period F2, the third offset gray value is about "60" (that is, VOFS2=(−4)×0.95+64).

In the frame period F3, the current gray value GR of the data signal SD is still "64". The third offset gray value VOFS2 is about "60". Therefore, based on the overdriving look-up table LUT1, the overdriving value generator 230 selects the first value D1_2 to be the overdriving value VOD. The first value D1_2 is "68", but the disclosure is not limited thereto. Therefore, the gray value of the compensated data signal SD' is "68" in frame period F3. Based on the offsetting look-up table LUT2, the frame progressive offsetting circuit 221 selects the second value D0_2 to be the progressive value VP according to the third offset gray value and the current gray value GR. The second value D0_1 is "−2", but the disclosure is not limited thereto. Therefore, the progressive value VP is "−2" in the frame period F3. The gain value VG is still "0.95". The offsetting circuit 220 generates the fourth offset gray value. In the frame period F3, the fourth offset gray value is about "62" (that is, the fourth offset gray value=(−2)×0.95+64).

In the frame period F4, the current gray value GR of the data signal SD is still "64". The fourth offset gray value VOFS2 is about "62". Therefore, based on the overdriving look-up table LUT1, the overdriving value generator 230 selects the first value D1_3 to be the overdriving value VOD. The first value D1_3 is "66", but the disclosure is not limited thereto. Therefore, the gray value of the compensated data signal SD' is "66" in frame period F4. Based on the offsetting look-up table LUT2, the frame progressive offsetting circuit 221 selects the second value D0_3 to be the progressive value VP according to the fourth offset gray value and the current gray value GR. The second value D0_1 is "−1", but the disclosure is not limited thereto. Therefore, the progressive value VP is "−1" in the frame period F4. The gain value VG is still "0.95". The offsetting circuit 220 generates the fifth offset gray value. In the frame period F4, the fifth offset gray value is about "63" (that is, the fifth offset gray value=(−1)×0.95+64).

In the embodiment, the compensating circuit 200 can overdrives the data signal SD according to the duty value DT lower than or equal to 50% of the emission driving signal EM and the low current gray value GR of the data signal SD with frames.

Figure 1:
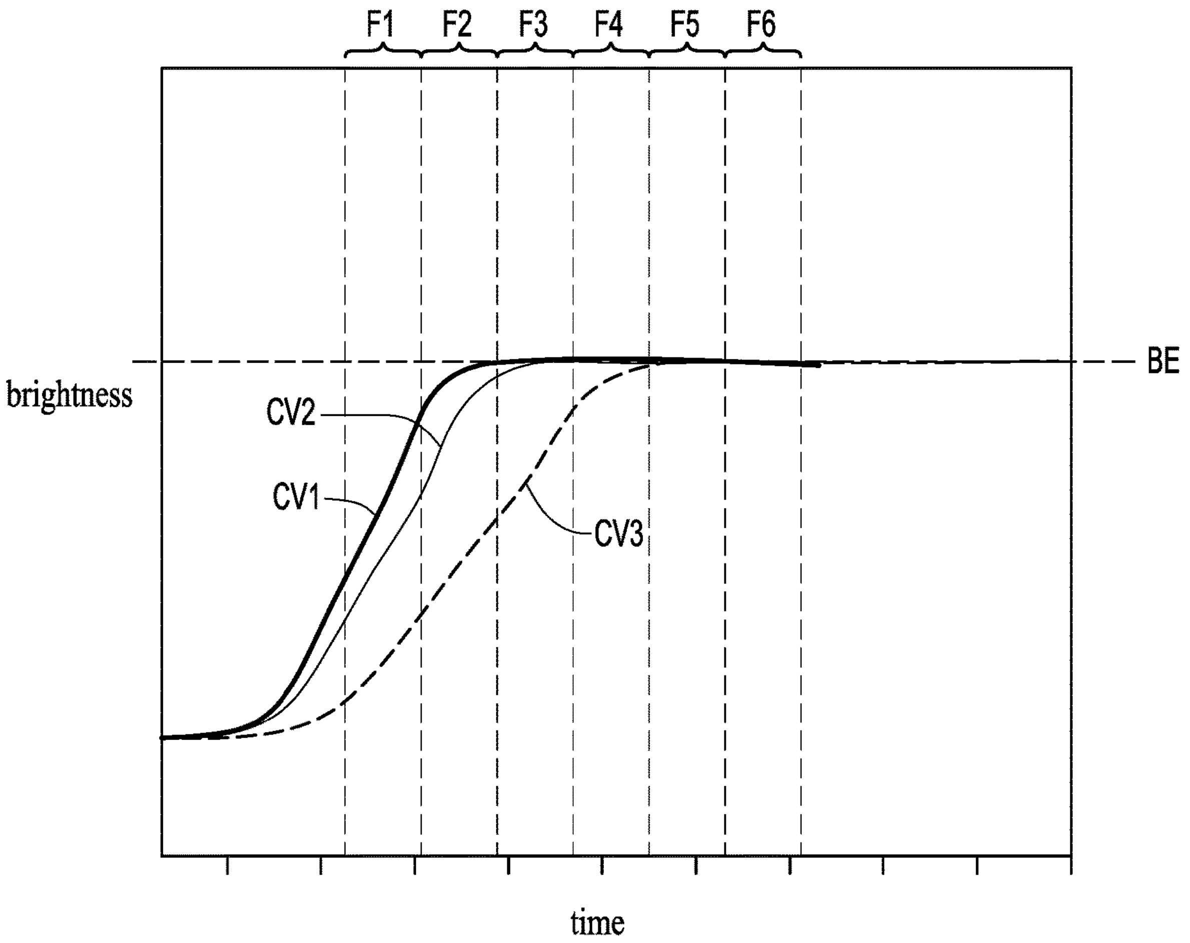
FIG. 1 (PRIOR ART)
FIG. 1 illustrates a schematic diagram of brightness with frames corresponding to a low duty value of an emission driving signal.
Figure 8:
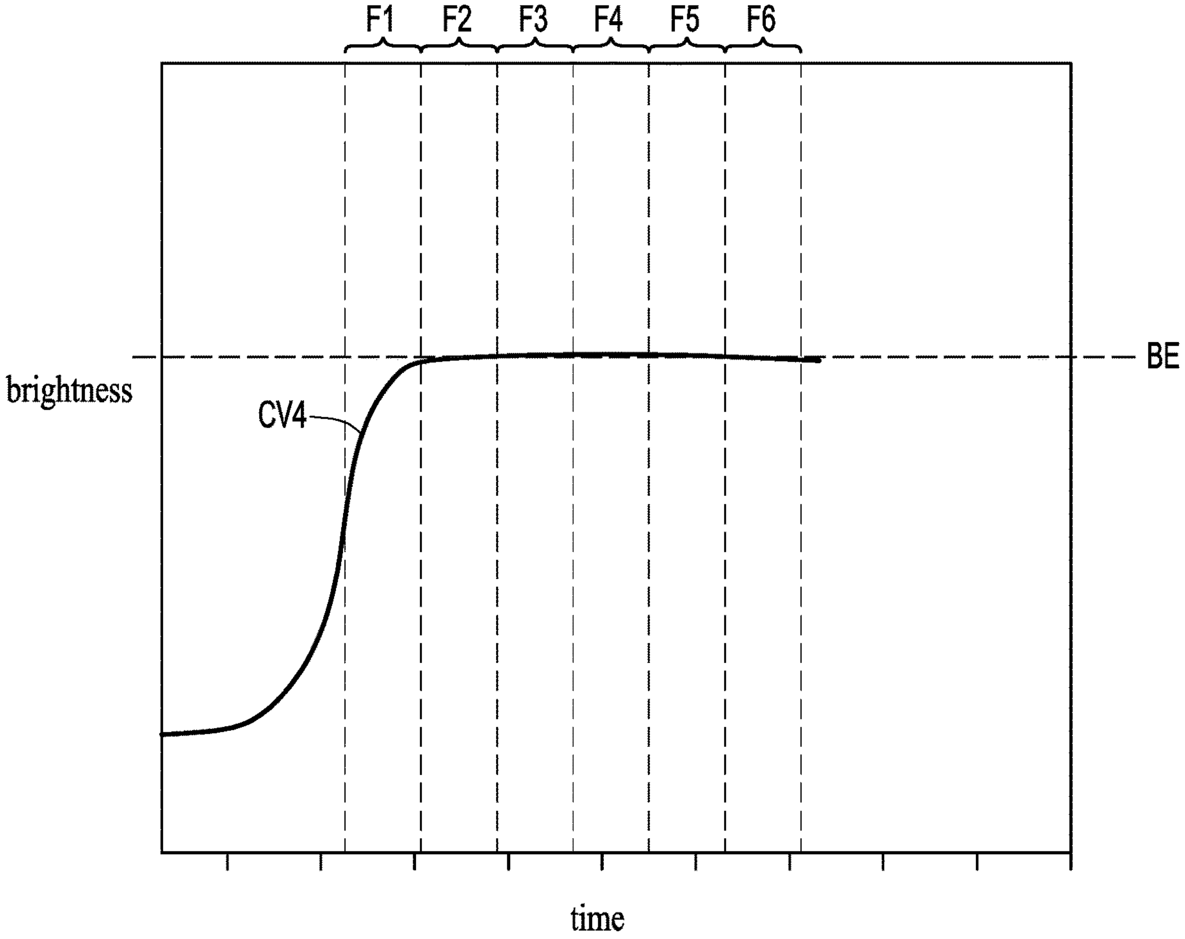
FIG. 8 illustrates a schematic diagram of a schematic diagram of brightness with frames according to an embodiment of the disclosure.

Please refer to FIG. 3 and FIG. 8, FIG. 8 illustrates a schematic diagram of a schematic diagram of brightness with frames according to an embodiment of the disclosure. FIG. 8 illustrates a brightness curve CV4. The brightness curve CV4 is a brightness curve of a green sub-pixel according to the compensated data signal SD' provided the compensating circuit 200, but the disclosure is not limited thereto. When the emission driving signal EM has low duty value DT and the data signal SD has low current gray value GR, the brightness of the brightness curve CV4 needs two frame periods to reach the expected brightness BE. Comparing to the brightness curve CV1 in FIG. 1, the frame periods required for the brightness of the brightness curve CV4 to reach the expected brightness BE could be decreased. Besides, the brightness curve CV4 could be modified based on the duty value DT lower than or equal to 50% of the emission driving signal EM with frames.

It should be noted, at least one of the first values in the overdriving look-up table LUT1, the second values in the offsetting look-up table LUT2 and the third values in the gain look-up table LUT3 may be modified based on different color. The first values in the overdriving look-up table LUT1, the second values in the offsetting look-up table LUT2 and the third values in the gain look-up table LUT3 may be set based on different actual test results and/or different actual requirements.

It should be understood that the brightness curve CV4 could be realized by the compensating circuit 100 in FIG. 2.

Figure 9:
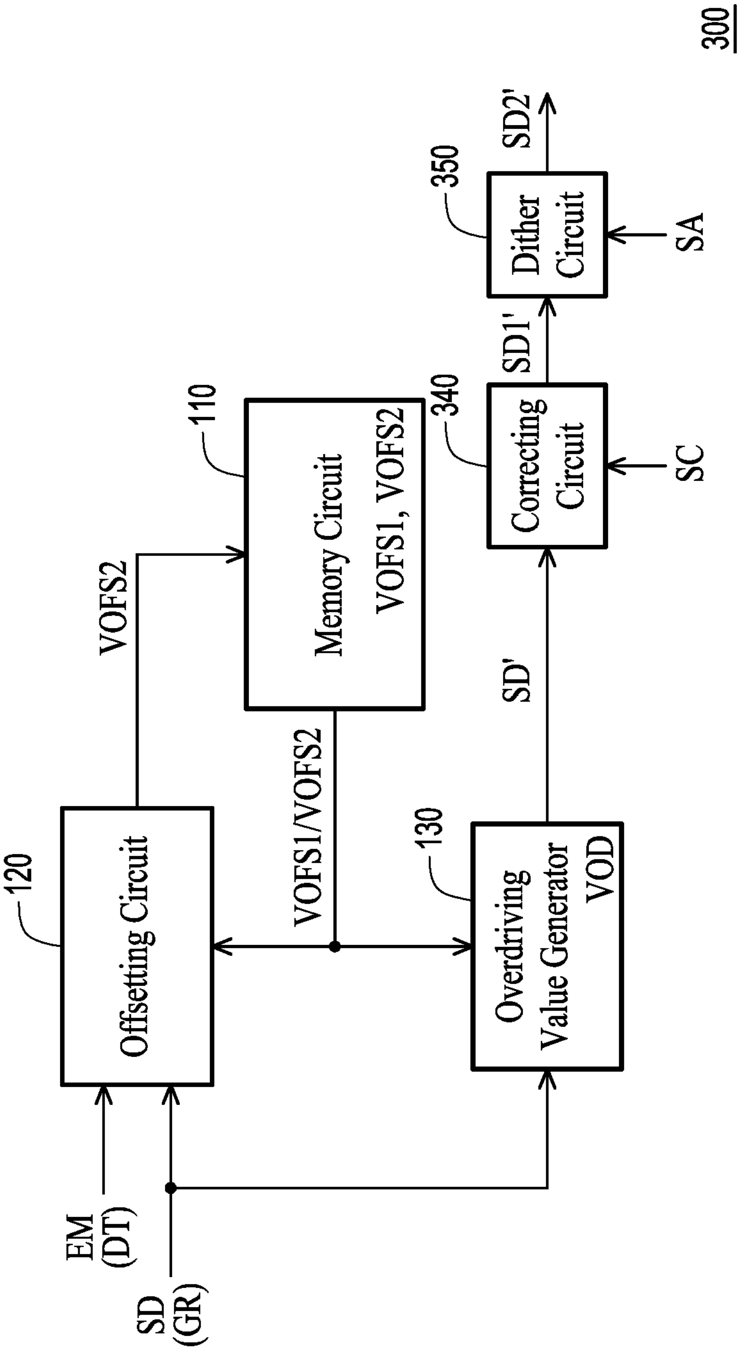
FIG. 9 illustrates a schematic diagram of a compensating circuit according to a second embodiment of the disclosure.

Please refer to FIG. 9, FIG. 9 illustrates a schematic diagram of a compensating circuit according to a second embodiment of the disclosure. In the embodiment, the compensating circuit 300 includes the memory circuit 110, the offsetting circuit 120 and the overdriving value generator 130, a correcting circuit 340 and a dither circuit 350. The memory circuit 110, the offsetting circuit 120 and the overdriving value generator 130 have been clearly explained in the embodiments of FIG. 2, so it will not be repeated here.

In the embodiment, the correcting circuit 340 is coupled to the overdriving value generator 130. the correcting circuit 340 corrects a color temperature of the compensated data signal SD' in response to a correcting command SC. The dither circuit 350 is coupled to the correcting circuit 340. The dither circuit 350 adjust a resolution of the compensated data signal SD' by a dither operation in response to an adjusting command SA. In the embodiment, the correcting circuit 340 corrects the color temperature of the compensated data signal SD' to generate corrected data signal SD1'. A resolution of the corrected data signal SD1' is equal to the resolution of the compensated data signal SD'. The dither circuit 350 receives the corrected data signal SD1' and adjusts the resolution to generate adjusted data signal SD2'.

In view of the foregoing, the compensating circuit compensates the current gray value of the data signal according to offset gray values of different frame periods, the duty value of an emission driving signal and the current gray value. Therefore, the data signal could be overdriven with frame period progressively based on the offset gray values and the duty values of different frame periods. The compensating circuit can compensate the data signal to decreased a number of frame periods required for the brightness of the sub-pixel to reach the expected brightness. When the emission driving signal has a lower duty value and the data signal has a lower gray value, A dynamic visual effect of a moving image of the display can be improved.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A compensating circuit for overdriving a data signal of a display device, comprising:

a memory circuit, configured to store a first offset gray value;

an offsetting circuit, coupled to the memory circuit, and configured to receive the first offset gray value, a duty value of an emission driving signal and a current gray value of the data signal, generate a second offset gray value of a second frame period after the first frame period according to the duty value, the current gray value and the first offset gray value, and store the second offset gray value into the memory circuit; and an overdriving value generator, coupled to the memory circuit, and configured to generate an overdriving value for overdriving the data signal to generate a compensated data signal according to the second offset gray value and the current gray value.

2. The compensating circuit of claim 1, wherein the overdriving value generator generates the overdriving value according to a variation between the second offset gray value and the current gray value in the second frame period.

3. The compensating circuit of claim 1, wherein the overdriving value generator comprises:

an overdriving look-up table, configured to store a plurality of first values corresponding different offset gray values and different current gray values of the data signal.

4. The compensating circuit of claim 3, wherein the overdriving value generator selects one of the plurality of first values to be the overdriving value according to an offset gray value and the current gray value received by the overdriving value generator.

5. The compensating circuit of claim 1, wherein the offsetting circuit comprises:

a frame progressive offsetting circuit, configured to generate a progressive value according to the current gray value and the first offset gray value; and a gain value generator, configured to generate a gain value corresponding the duty value;

wherein the offsetting circuit generates the second offset gray value according to the gain value, the progressive value and the current gray value.

6. The compensating circuit of claim 5, wherein the offsetting circuit further comprises:

a multiplier, coupled to the frame progressive offsetting circuit and the gain value generator, and configured to multiply the progressive value and the gain value to generate a product value; and an adder, coupled to the multiplier and the memory circuit, and configured to add the current gray value and the product value to generate the second offset gray value.

7. The compensating circuit of claim 5, wherein the frame progressive offsetting circuit comprises:

an offsetting look-up table, configured to store a plurality of second values corresponding different offset gray values and different current gray values of the data signal.

8. The compensating circuit of claim 5, wherein the frame progressive offsetting circuit selects one of the plurality of second values to be the progressive value according to an offset gray value and the current gray value received by the frame progressive offsetting circuit.

9. The compensating circuit of claim 1, wherein the gain value generator comprises:

a gain look-up table, configured to store a plurality of third values corresponding different duty values.

10. The compensating circuit of claim 9, wherein the gain value generator selects one of the plurality of third values to be the gain value according to the duty value received by the gain value generator.

11. The compensating circuit of claim 9, wherein the plurality of third values are positively correlated with the duty value low than or equal to 50% received by the gain value generator.

12. The compensating circuit of claim 1, wherein:

the overdriving value generator generates the compensated data signal according to the overdriving value, and wherein the overdriving value is a gray value of the compensated data signal of the second frame period.

13. The compensating circuit of claim 12, further comprising:

a correcting circuit, coupled to the overdriving value generator, and configured to correct a color temperature of the compensated data signal in response to a correcting command.

14. The compensating circuit of claim 13, further comprising:

a dither circuit, coupled to the correcting circuit, and configured to adjust a resolution of the compensated data signal by a dither operation in response to an adjusting command.

* * * * *